United States Patent
Han

(10) Patent No.: US 8,235,688 B2
(45) Date of Patent: Aug. 7, 2012

(54) FAN

(75) Inventor: Xu-Sheng Han, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 216 days.

(21) Appl. No.: 12/779,928

(22) Filed: May 13, 2010

(65) Prior Publication Data

US 2011/0215665 A1    Sep. 8, 2011

(30) Foreign Application Priority Data

Mar. 8, 2010    (CN) .................. 2010 1 0119517

(51) Int. Cl.
*F04B 7/04*    (2006.01)
*H02K 5/10*    (2006.01)
(52) U.S. Cl. .................. 417/423.9; 310/63; 310/88
(58) Field of Classification Search .............. 310/63, 310/67 R, 88, 156.26; 417/423.7, 423.14, 417/423.9
See application file for complete search history.

(56) References Cited

U.S. PATENT DOCUMENTS

| | | | | |
|---|---|---|---|---|
| 4,658,312 A * | 4/1987 | Elsasser et al. | ............ | 360/99.08 |
| 4,861,237 A * | 8/1989 | Shiraki et al. | ................. | 417/353 |
| 6,511,303 B2 * | 1/2003 | Obara | ....................... | 417/423.12 |
| 6,551,074 B2 * | 4/2003 | Kudo et al. | .................... | 417/354 |
| 6,572,346 B2 * | 6/2003 | Hsieh | ............................. | 417/354 |
| 6,616,422 B2 * | 9/2003 | Hsieh | ............................. | 417/354 |
| 6,916,160 B2 * | 7/2005 | Obara | ........................... | 417/354 |
| 7,061,155 B1 * | 6/2006 | Lee | ............................... | 310/261.1 |
| 7,635,934 B2 * | 12/2009 | Zhu et al. | ......................... | 310/88 |
| 2008/0067899 A1 * | 3/2008 | Son | .............................. | 310/67 R |
| 2010/0272586 A1 * | 10/2010 | Hsu et al. | ...................... | 417/354 |

\* cited by examiner

*Primary Examiner* — Burton Mullins
(74) *Attorney, Agent, or Firm* — Altis Law Group, Inc.

(57) ABSTRACT

A fan includes a bracket, a stator, and a rotor. The bracket includes a tray, and a frame circling the tray. The stator is mounted to the tray and circled by the frame. The rotor includes a shaft, and a shell covering the stator. The rotor shell includes a top board, and a cylindrical hollow sleeve extending down perpendicularly from the top board. The shaft extends down perpendicularly from a center of the top board, and is rotatably mounted to the stator. A lower portion of the sleeve bounds a circumference of the tray. An assembly clearance is formed between the lower portion of the sleeve and the tray.

2 Claims, 2 Drawing Sheets

FAN

CROSS-REFERENCE TO RELATED APPLICATION

The present application is related to a co-pending U.S. patent application, titled "FAN", with Docket Number US29367, assigned to the same assignee as named herein, the disclosure of which is incorporated herein by reference.

BACKGROUND

1. Technical Field

The present disclosure relates to a fan.

2. Description of Related Art

When a fan operates, dust seems to inevitably penetrate the rotor of the fan through an assembly clearance that is formed during assembly of the fan and is between the rotor and a bracket for mounting the rotor and a stator. The dust can damage and shorten the service life of the fan.

In order to reduce damage caused by dust, anti-dust devices, such as dust rings, have been used for fans. An anti-dust device is often mounted between the bracket and the rotor to prevent dust from going through the assembly clearance. However, using anti-dust devices will increase the cost of fans.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
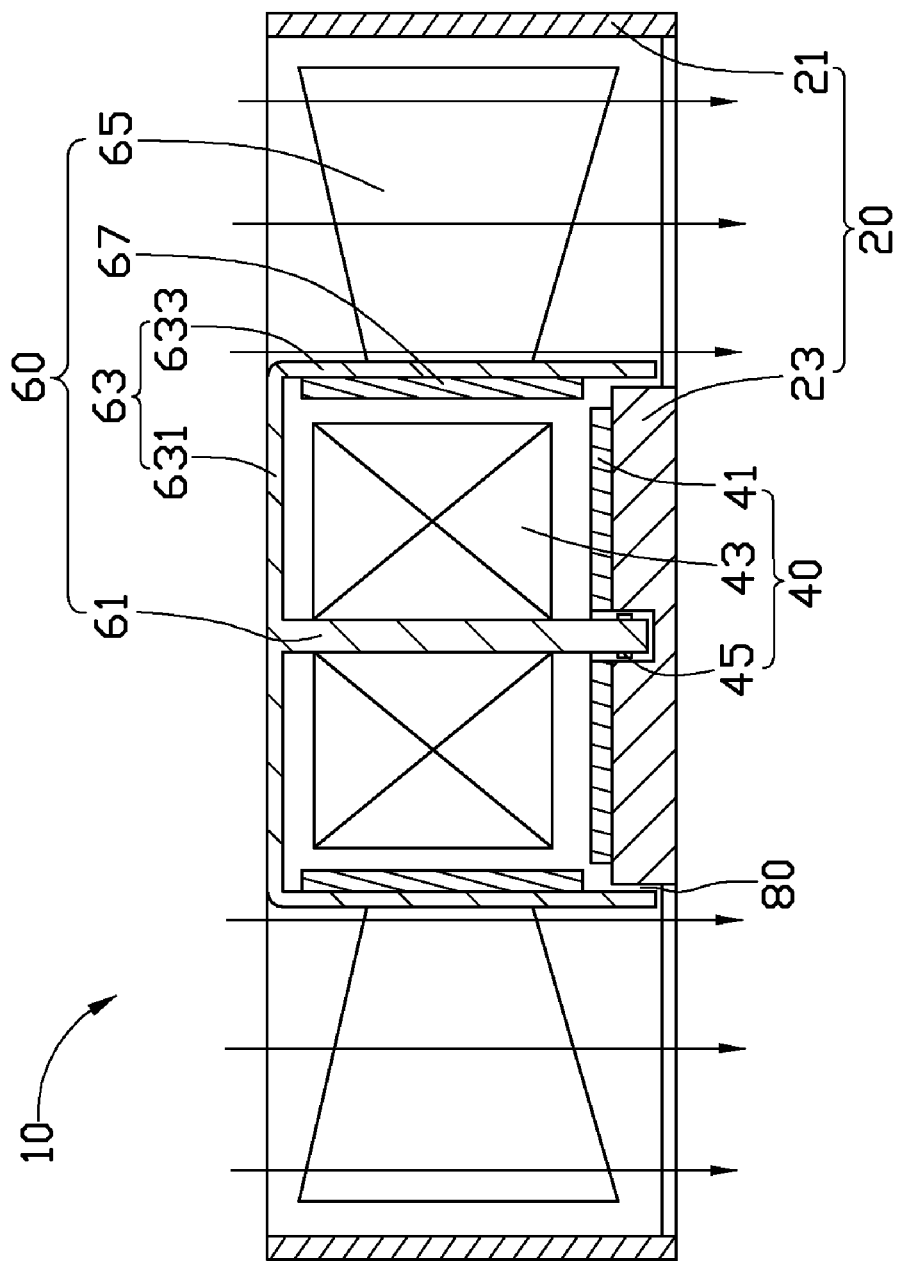
FIG. 1 is a sectional view of a first embodiment of a fan.

Referring to FIG. 1, in a first embodiment, a fan 10 includes a bracket 20, a stator 40, and a rotor 60. The stator 40 and the rotor 60 are mounted to the bracket 20.

The bracket 20 is a plastic part integrally formed. The bracket 20 includes a tray 23, and a frame 21 circling the tray 23.

The stator 40 is mounted to the tray 23 of the bracket 20 and circled by the frame 21 of the bracket 20. The stator 40 includes a circuit board 41, a plurality of coils 43, and a ring 45. The circuit board 41 includes a control circuit for controlling rotation speed of the fan 10.

The rotor 60 includes a shaft 61, a shell 63, a plurality of blades 65, and a plurality of magnets 67. The shell 63 includes a substantially round top board 631, and a cylindrical hollow sleeve 633 extending down perpendicularly from a circumference of the top board 631. The shaft 61 extends perpendicularly down from a center of the top board 631. The shaft 61 is rotatably mounted to the ring 45 of the stator 40. The shell 63 covers the stator 40, wherein a lower portion of the sleeve 633 bounds a circumference of the tray 23. An assembly clearance 80 is formed between the lower portion of the sleeve 633 and the tray 23. The assembly clearance 80 can ensure that the shell 63 will not contact the tray 23 when the rotor 60 rotates. The blades 65 extend from the shell 63, and are located between the shell 63 and the frame 21 of the bracket 20. The magnets 67 are attached to an inner surface of the shell 63, and are disposed around the coils 43 of the stator 40.

When a common fan operates, a part of the airflow caused by the fan will be rebounded by a tray of the fan to flow into a rotor of the fan, which is the main way that dust enters. When the fan 10 of the present disclosure operates, because the lower portion of the sleeve 633 encircles the tray 23, the airflow can hardly contact the tray 23 and therefore be hardly rebounded into the rotor 60 preventing dust from entering the rotor 60.

Furthermore, a width of the assembly clearance 80 in this embodiment is about 0.5 millimeters, for preventing dust from entering the rotor 60, and keeping a proper distance between the tray 23 and the sleeve 633 to ensure normal rotation of the rotor 60.

Figure 2:
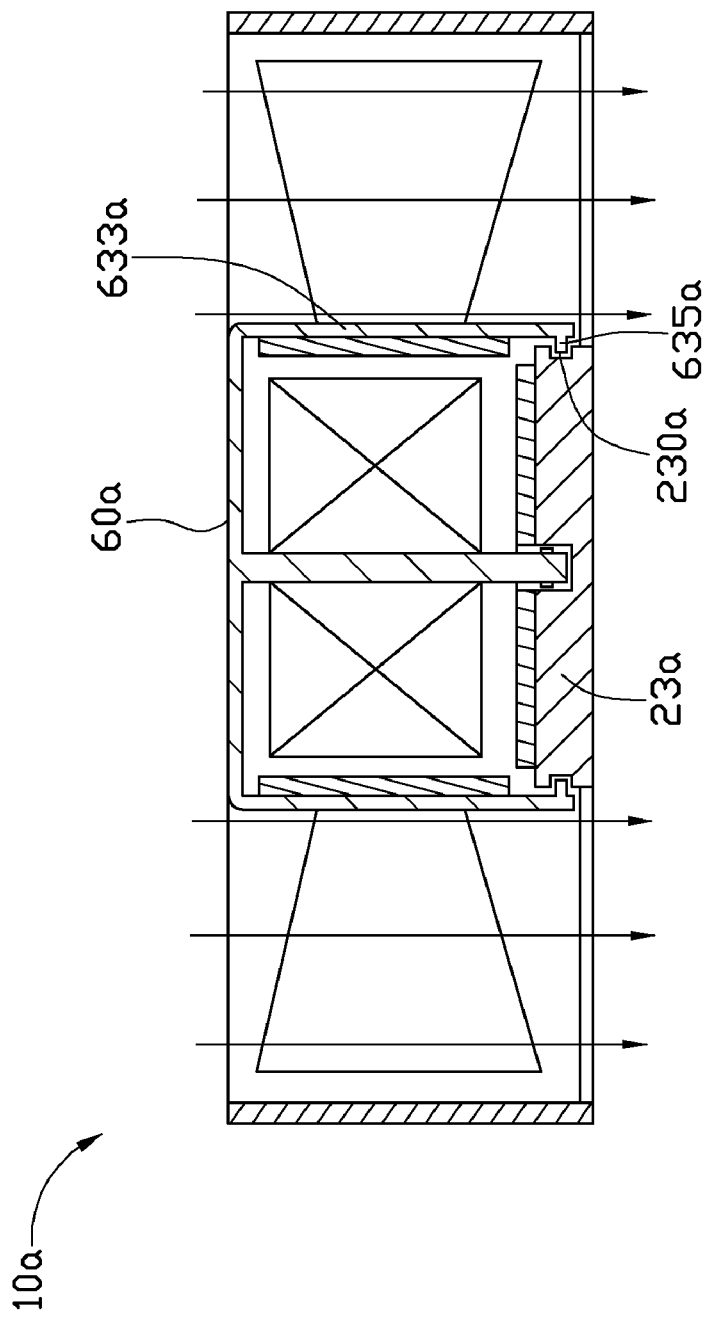
FIG. 2 is a sectional view of a second embodiment of a fan.

Referring to FIG. 2, a fan 10a in a second embodiment differs from the fan 10 in FIG. 1 in that an annular groove 230a, around a tray 23a, is defined in a circumference of the tray 23a. Correspondingly, an annular projection 635a extends from an inner surface of a sleeve 633a of a rotor 60a, and extends in the annular groove 230a. The design of the annular groove 230a and the annular projection 635a can further prevent dust from entering the rotor 60a.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclose to the full extent indicated by the broad general meaning of the terms in which the appended claims are expressed.

What is claimed is:

1. A fan comprising:
    a bracket comprising a tray defining an annular groove in the circumference of the tray, and a frame circling the tray;
    a stator mounted to the tray and circled by the frame; and
    a rotor comprising a shaft, and a shell covers the stator, the shell comprising a top board, and a cylindrical hollow sleeve extending perpendicularly down from the top board, wherein the shaft extends perpendicularly down from a center of the top board and is rotatably mounted to the stator, a lower portion of the sleeve bounds a circumference of the tray, an assembly clearance is formed between the lower portion of the sleeve and the tray, and an annular projection correspondingly extends from an inner surface of the sleeve into the annular groove.

2. The fan of claim 1, wherein a width of the assembly clearance is about 0.5 millimeters.

* * * * *